Oct. 31, 1967   R. J. VANDE WIELE   3,349,747
INDICATOR FOR COMBINE HEADER OR THE LIKE
Filed May 6, 1965                                       2 Sheets-Sheet 1
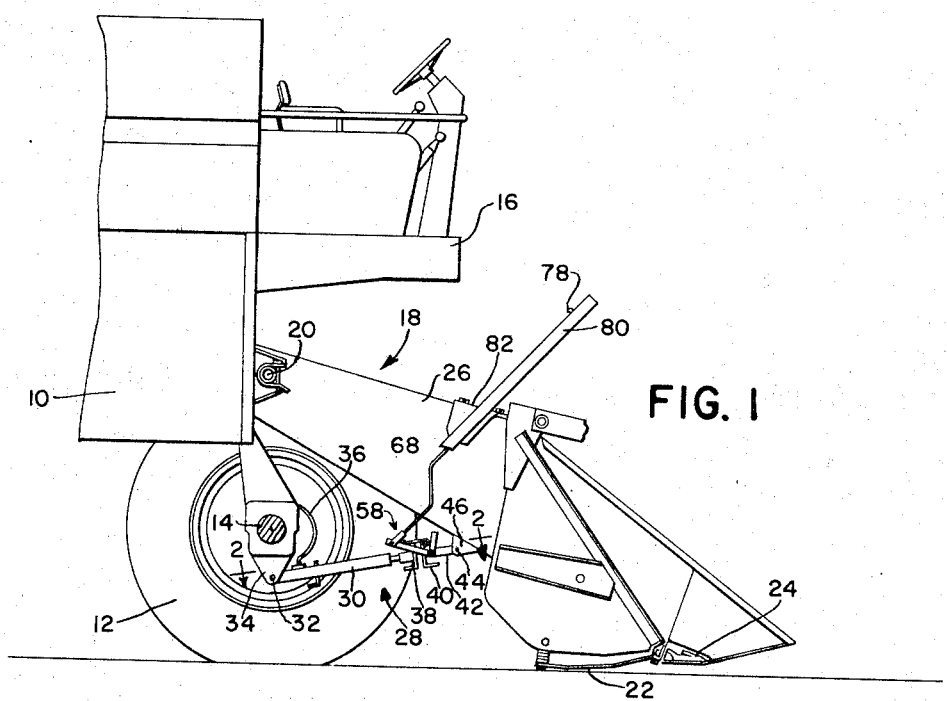
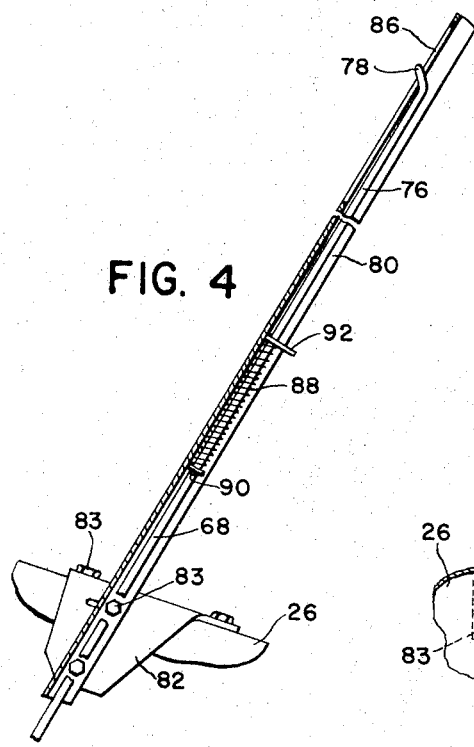
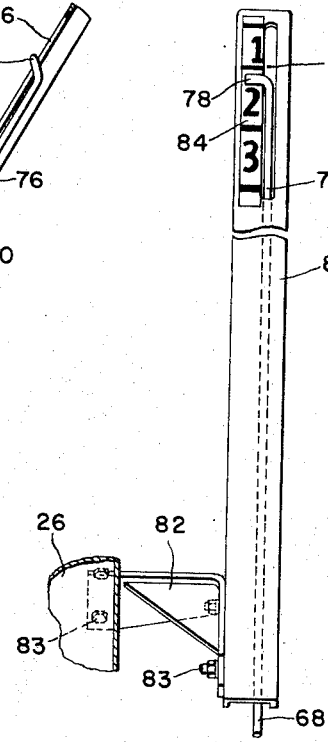
INVENTOR.
ROBERT J. VANDE WIELE Oct. 31, 1967   R. J. VANDE WIELE   3,349,747
INDICATOR FOR COMBINE HEADER OR THE LIKE
Filed May 6, 1965   2 Sheets-Sheet 2

INVENTOR.
ROBERT J. VANDE WIELE

United States Patent Office 3,349,747
Patented Oct. 31, 1967

3,349,747
INDICATOR FOR COMBINE HEADER OR
THE LIKE
Robert Jean Vande Wiele, Silvis, Ill., assignor to Deere &
Company, Moline, Ill., a corporation of Delaware
Filed May 6, 1965, Ser. No. 453,624
2 Claims. (Cl. 116—124)

ABSTRACT OF THE DISCLOSURE

A self-propelled combine having a forwardly disposed vertically adjustable header, a float and adjusting mechanism including a pair of laterally spaced hydraulic cylinders mounted on the combine body and connected to the header by springs which deflect to allow the header to follow the ground while partially counterbalancing the weight of the header, and an indicator visible from the operator's station and mechanically connected to the float and adjusting mechanism to provide the operator with a visual indication of the amount of header float provided by the float and adjusting mechanism.

---

This invention relates to an agricultural crop-handling machine, such as a combine or the like, having a float and adjusting mechanism, such as is described in U.S. Patent 3,238,709, issued Mar. 8, 1966, for supporting the operating part or header, and more particularly to a device for indicating the float position in such a float and adjusting mechanism.

As described in said application, a typical combine includes a forwardly extending header, pivotally mounted on a horizontal pivot for vertical adjustment by a force-exerting device, such as a hydraulic piston and cylinder. Since the header often travels on or close to the ground, it frequently encounters ground variations which cause it to bounce or dig in.

In the float and adjusting mechanism described in said application, a spring means functions in series with the force-exerting device to partly counterbalance the header, aiding the raising of the header when it encounters a hummock and retarding the descent of the header when a depression is encountered. The float and adjusting mechanism includes a pair of transverse, parallel members, one attached to the force-exerting device and the other to the header, and spring means biasing said members apart. The force-exerting device is generally set so that the members are spaced a relatively short distance apart when the header contacts level ground. The spacing between the members determines the float of the header, the optimum amount of which depends on the field and crop conditions.

Since the float and adjusting mechanism is conventionally located below a portion of the feeder house rearwardly of the header, it is impossible for the operator to observe the spacing between said members from the operator's station above the header. Thus he is unable to determine whether the force-exerting device is properly set. Moreover, the header is frequently raised by means of the force-exerting device to clear an obstruction or for transport, thereby changing the amount of float. The operator then finds it difficult to regain the previous setting.

According to the present invention, a device is provided for indicating to the operator the spacing between said members and consequently the amount of float. It is therefore a principal object of the invention to provide an indicating device for use with a float and adjusting mechanism to indicate the amount of float provided by said mechanism, and more particularly to indicate the spacing between a pair of relatively movable members in such a mechanism.

Another object is to provide such an indicator device which is clearly visible to the operator of a combine or the like from the operator's station.

Still another object of the invention is to provide such an indicating device of simple and inexpensive construction that may be produced as a compact and low-cost unit which can be built into current machines, provided as an optional accessory, or provided as an attachment for existing machines having float and adjusting mechanisms.

These and other objects will become apparent from a consideration of the following detailed description and accompanying drawings wherein:

FIG. 1 is a side elevation of a forward portion of a typical combine with portions omitted and other portions broken away.

FIG. 4 is an enlarged elevation of the upper portion of the indicating device, with portions broken away and shown in section.

FIG. 5 is an enlarged rear elevation of the upper portion of the indicating device shown in FIG. 4.

Figure 2:
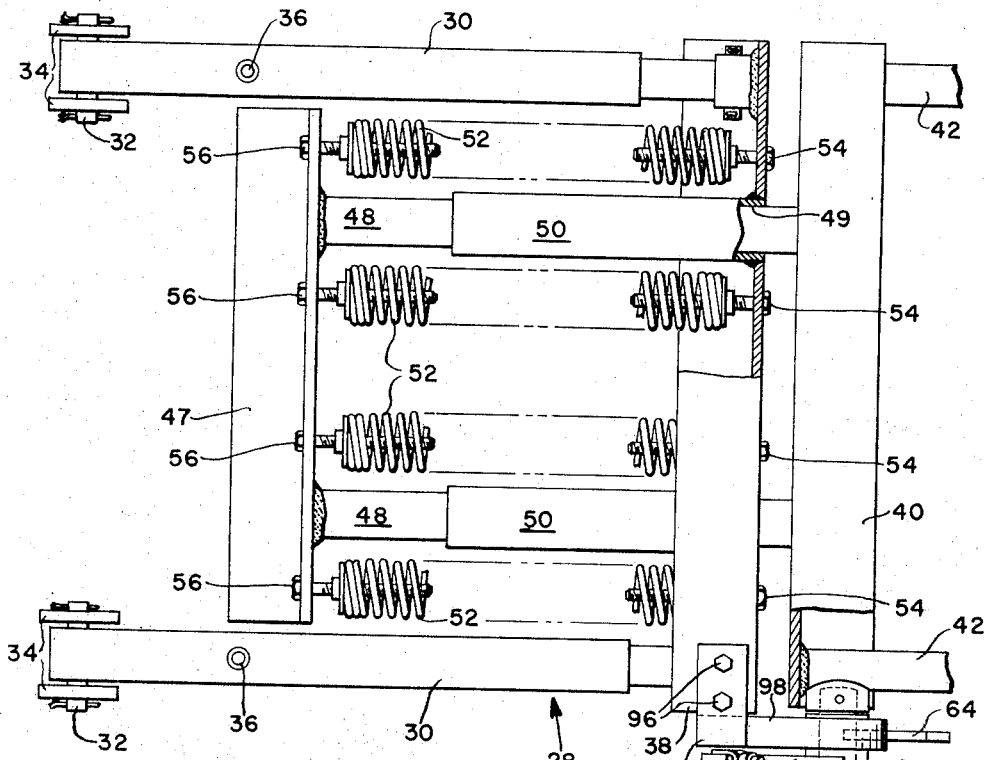
FIG. 2 is an enlarged plan, with portions broken away and shown in section, of the float and adjusting mechanism as seen generally along the line 2—2 of FIG. 1.
Figure 3:
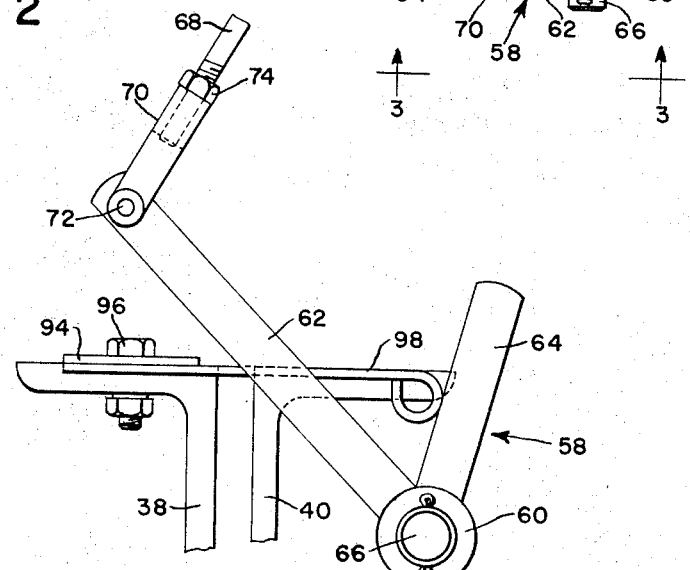
FIG. 3 is an enlarged elevation of the lower portion of the indicating device as seen generally along the line 3—3 of FIG. 2.

Although the invention is described for use on an agricultural combine, it may be used in conjunction with a float and adjusting mechanism on any similar machine in which such a mechanism finds utility. Moreover, the use of such terms as "upwardly," "downwardly," "forward," "rear," etc. is for convenience only and such terms are not to be construed as limiting the scope of the invention.

The combine chosen for purpose of illustration has a main body 10 mounted for advance over the ground on a pair of transversely spaced traction wheels 12, only one of which is shown, by means of an axle structure 14. The body 10 includes a forwardly disposed operator's station 16. A conventional header 18 is pivoted at its rear to the body 10 by a transverse pivot 20 below the operator's station 16. The header 18 extends forwardly from the body 10 and has ground-engaging skid means 22 at a forward portion thereof. The header includes a typical cutting mechanism 24 and feeder house 26.

The weight of the header 18 is partially supported by a float and adjusting mechanism 28 which functions to raise and lower the header about the pivot 20. The mechanism 28 includes one or more force-exerting devices 30, such as a hydraulic ram or motor having one end mounted on a transverse pivot carried by brackets 34 depending from the axle structure 14. Fluid pressure is supplied to and exhausted from the ram 30 by means of a hydraulic line 36 under the control of the operator.

The mechanism 28 includes a transversely elongated member 38 mounted on the forward end of the piston of the ram 30 and a force-receiving or forward member 40 mounted on the header 18 forwardly from and parallel to the member 38 by means of a pair of fore-and-aft support rods 42 that have their forward ends pivotally connected to the header 18 by transverse pins 44 in brackets 46 depending from the underside of the feeder house 26. A rear transverse member 47 is parallel to and spaced rearwardly from the forward member 40 and the intermediate member 38 and is rigidly connected to the forward member 40 by means of fore-and-aft rods 48, which slidably extend through apertures 49 in the intermediate member 38 and coaxial tubular guide members 50 carried by the intermediate member 38.

The intermediate member 38 is connected to the rear member 47 by a plurality of spring means 52, each spring being a tension spring having its forward end connected to the intermediate member 38 by an adjusting screw 54 and its rear end connected to the rear member 47 by an adjusting screw 56. The forward force exerted by the springs on the rear member 47 is transmitted to the forward member 40 by the rods 48, thus biasing the forward member away from the intermediate member 38. When the force-exerting device 30 is extended, the forward force on the intermediate member 38 is transmitted to the header 18 via the spring means 52, rear member 47, rods 48, front member 40, and support rods 42, the forward force tending to raise the header 18 about the pivot 20.

In operation, the spring tension is adjusted by the adjusting screws 54 and 56 to vary the amount of float or lifting force exerted on the header 18. The adjusting screws are preferably set to provide a lifting force less than the gravity force on the header, so that the header is partially supported by the skids 22. Thus, when the header encounters a rise in the ground, the lifting force supplements the upward force on the header created by the impact with the ground, causing the header to easily rise without digging in. Conversely, when a depression is encountered, the header will gradually lower, the rate of descent being retarded by the lifting force exerted by the spring means 52.

When the spring means 52 are properly adjusted, the ram 30 can be extended, without raising the header, until the members 38 and 40 abut, the heads of the adjusting screws 54 being received in apertures in the member 40. Further extension of the ram 30 raises the header 18 clear of the ground and the header is firmly supported by the abutting members 38 and 40 and will not bounce when it is in a raised position, such as during transport travel of the machine. When the ram 30 is exhausted, the weight of the header 18 retracts the ram until the header engages the ground, at which time the spring means 52 causes further retraction until the ram is fully retracted or the operator ends the exhaust, the additional retraction separating the members 38 and 40.

For any given setting of the spring means 52, the amount of float provided by the float and adjusting mechanism 28 is determined by the spacing between the members 38 and 40, the greater separation the less the extension of the spring means 52 and the force exerted thereby. The amount of separation between the members 38 and 40 also controls the amount of downward float of the header when a depression is encountered, since the header can descend only until the members abut.

The amount of separation between the members 38 and 40, however, can be varied for different conditions, and the members afford an ideal visual indication of the selected setting. But these cannot be easily seen from the operator's station 16. To solve this problem, the present invention provides indicator means readily visible to the operator and connected to the float and adjusting mechanism 28 to indicate the separation between the members 38 and 40 to the operator.

The indicator means includes a lever member or bell crank 58 having a hut 60 and first and second lever arms 62 and 64 and rotatably mounted on a transverse shaft 66 carried by the forward member 40. The indicator means also includes an elongated indicator rod 68 pivotally connected at its lower end 70 to the end of the first lever arm 62 by a transverse pivot 72. The lower end 70 of the rod 68 includes an adjusting means 74 for changing the length of the rod. The rod 68 has an upper portion 76 extending upwardly and forwardly over the header 18 and terminating in a hook portion 78 visible from the operator's station 16.

An elongated scale member 80 is attached to the header 18 by means of a bracket 82 and fasteners 83 and lies closely parallel to the upper portion 76 of the rod 68. The scale member 80 has graduations 84, visible from the operator's station 16, and further has an elongated slot 86 through which the hook portion 78 of the rod 68 extends for movement relative to the graduations 84. The rod 68 is biased downwardly by spring means 88 extending between a pin 90 connected to the rod and an apertured ear 92 rigid on the scale member.

A connecting member 94 is rigidly attached to the intermediate member 38 by fasteners 96 and includes a forwardly extending portion 98 which engages and causes movement of the second lever arm 64 as the separation between the members 38 and 40 changes.

In operation, the indicating means and the float and adjusting mechanism 28 are adjusted so that the hook portion 78 is at a predetermined position relative to the graduations 84 on the scale member 80 when the separation between the members 38 and 40 is at a distance that best suits the particular field and crop conditions. If it is necessary to raise the header for transport or to clear an obstruction, the optimum setting of the force-exerting device 30 is changed, the rod 68 moving upwardly as the bell crank 58 rocks clockwise in response to closing of the gap or space between the members 38 and 40. However, when the header 18 is again lowered into operating position, the operator can retract the force-exerting device 30 to its previous position by observing the indicator means and halting the retraction when the hook portion 78 reaches the predetermined point along the graduations 84 as the rod 68 moves downwardly under action of the spring 88 in response to separation of the members and counterclockwise rocking of the bell crank 58. Since the space between the members 38 and 40 is being constantly measured by the indicator means, the operator can constantly determine the float of the platform, and make the necessary adjustments to provide the optimum amount of float as the vehicle moves along by means of the remotely controlled ram 30.

Other features and advantages of the present invention will readily occur to those skilled in the art, as will many modifications and alterations in the preferred embodiment of the invention described herein, all of which may be achieved without departing from the spirit and the scope of the invention.

What is claimed is:

1. In a harvesting machine having a mobile body adapted to advance over the ground, a forwardly disposed header carried by and mounted for vertical adjustment on the body, and a float and adjusting mechanism operative between the body and the header to vertically adjust the header on the body between an operating position wherein it is partially supported by the ground and an elevated position and to proportion the weight of the header between the body and the ground when the header is in its operating position, said float and adjusting mechanism including a pair of opposite members movable toward and away from each other, and whose distance apart varies according to the proportion of the header weight supported by the ground, the improvement comprising: a stationary indicator element mounted on the harvesting machine, a movable indicator element mounted for movement adjacent and relative to the stationary element, and means operatively connecting the movable indicator element to the float and adjusting mechanism to shift the movable indicator element relative to the stationary element in response to movement of said opposite float and adjusting mechanism members toward and away from one another.

2. The invention defined in claim 1 wherein the harvesting machine includes an elevated forwardly disposed operator's station mounted on the body above the header and float and adjusting mechanism, and the stationary indicator element includes an elongated scale attached to the header forwardly of and below the operator's station and having indicia visible from the operator's station, and the movable indicator element includes an axially shiftable rod having an upper portion longitudinally shiftable adjacent and relative to the stationary element.

References Cited

UNITED STATES PATENTS

| | | | |
|---|---|---|---|
| 1,491,168 | 4/1924 | Prendergast | 37—98 |
| 2,022,844 | 12/1935 | Christian | 116—124 |
| 2,874,789 | 2/1959 | Hershman | 116—124 |
| 3,017,046 | 1/1962 | Runci et al. | 214—140 |
| 3,238,709 | 3/1966 | Williams | 56—208 |

FOREIGN PATENTS

| | | |
|---|---|---|
| 558,460 | 6/1958 | Canada. |
| 1,351,902 | 12/1963 | France. |
| 874,521 | 6/1953 | Germany. |

LOUIS J. CAPOZI, *Primary Examiner.*